(12) United States Patent
Mayberry et al.

(10) Patent No.: US 9,500,438 B2
(45) Date of Patent: *Nov. 22, 2016

(54) LOCKABLE SNAP-CLIP FASTENER

(75) Inventors: Michael Mayberry, Denver, CO (US); Brad Bennett, Lafayette, CO (US)

(73) Assignee: MAGPUL INDUSTRIES CORP., Austin, TX (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/343,734

(22) PCT Filed: Sep. 7, 2012

(86) PCT No.: PCT/US2012/054303
§ 371 (c)(1),
(2), (4) Date: Nov. 20, 2014

(87) PCT Pub. No.: WO2013/036864
PCT Pub. Date: Mar. 14, 2013

(65) Prior Publication Data
US 2015/0082585 A1    Mar. 26, 2015

Related U.S. Application Data

(63) Continuation of application No. 13/439,034, filed on Apr. 4, 2012, now Pat. No. 8,544,153.

(60) Provisional application No. 61/533,104, filed on Sep. 9, 2011.

(51) Int. Cl.
| | | |
|---|---|---|
| F16B 2/10 | (2006.01) | |
| F16B 17/00 | (2006.01) | |
| F41C 23/02 | (2006.01) | |
| F16B 45/02 | (2006.01) | |
| F41C 33/00 | (2006.01) | |
| A45F 3/14 | (2006.01) | |

(52) U.S. Cl.
CPC .......... *F41C 23/02* (2013.01); *A45F 2003/142* (2013.01); *F16B 45/02* (2013.01); *F41C 33/002* (2013.01); *Y10T 24/44427* (2015.01)

(58) Field of Classification Search
CPC ............. F41C 23/02; F41C 33/002; F16B 45/02; A45F 2003/142; Y10T 24/44427

See application file for complete search history.

(56) References Cited

U.S. PATENT DOCUMENTS

| | | | |
|---|---|---|---|
| 186,637 A | 1/1877 | Tanner | |
| 1,032,369 A | 7/1912 | Baxter | |
| 1,334,830 A * | 3/1920 | Bastord | B66C 1/36 24/600.2 |
| 1,376,258 A * | 4/1921 | Cox | B66C 1/36 24/600.2 |
| 2,896,288 A * | 7/1959 | Davis | A44B 11/25 24/323 |
| 3,074,136 A | 1/1963 | Looker | |

(Continued)

*Primary Examiner* — Robert J Sandy
*Assistant Examiner* — Louis Mercado
(74) *Attorney, Agent, or Firm* — Neugeboren O'Dowd PC

(57) ABSTRACT

A lockable snap-clip fastener (10) has two spring-biased jaw members (12, 14) and a slidable locking bar (16). The same spring (13) that biases the jaws (12, 14) holds the locking bar (16) in either an open or a closed position with one of its arms. Since the bar (16) is held in either the locked or unlocked position, it is more secure and must be positively actuated in order to transition from one configuration to the other.

3 Claims, 6 Drawing Sheets

(56) References Cited

U.S. PATENT DOCUMENTS

| | | | |
|---|---|---|---|
| 3,358,340 A | 12/1967 | Higuchi | |
| 3,940,173 A * | 2/1976 | Ulbing | B66C 1/36 24/600.2 |
| 4,667,379 A | 5/1987 | Tsamas et al. | |
| 5,279,021 A | 1/1994 | Edgin | |
| 5,398,389 A | 3/1995 | Terada et al. | |
| 5,832,571 A | 11/1998 | Kanamori | |
| 6,505,487 B1 | 1/2003 | Garel et al. | |
| 6,530,196 B1 | 3/2003 | Oyster et al. | |
| 6,588,076 B1 | 7/2003 | Choate | |
| 6,802,109 B2 | 10/2004 | Hede et al. | |
| 7,784,121 B2 | 8/2010 | Ahlman | |
| D632,954 S | 2/2011 | Fitzpatrick et al. | |
| 8,042,235 B2 | 10/2011 | Wu | |
| D679,580 S | 4/2013 | Fitzpatrick et al. | |
| 8,925,162 B2 * | 1/2015 | Hong | F16B 45/02 24/600.2 |
| 2002/0174815 A1 | 11/2002 | Tylaska | |

\* cited by examiner

LOCKABLE SNAP-CLIP FASTENER

CROSS-REFERENCES TO RELATED APPLICATIONS

This Application claims priority as an entry into the U.S. national phase of PCT Application PCT/US2012/054303, filed 7 Sep. 2012, which in turn claims priority based on prior filed U.S. Provisional Application No. 61/533,104, filed 9 Sep. 2011 and as a continuing application of prior filed U.S. Non-provisional application Ser. No. 13/439,034, filed 4 Apr. 2012 and issued 10 Oct. 2013 as U.S. Pat. No. 8,544,153. This Application incorporates these prior applications herein by reference in their entirety.

TECHNICAL FIELD

The present invention relates to the field of fasteners and more particularly relates to a lockable snap-clip fastener.

BACKGROUND ART

The present invention is a lockable snap clip that comprises fewer parts than prior art snap clips and uses them in a simple arrangement which makes the snap clip of the present invention advantageous over the prior art.

The present invention represents a departure from the prior art in that the snap clip of the present invention allows for a lockable snap clip which is simple and intuitive to use that will remain in either a locked or unlocked configuration until the user desires to switch from one to the other.

DISCLOSURE OF THE INVENTION

In view of the foregoing disadvantages inherent in the known types of snap-clip fasteners, this invention provides a lockable snap-clip fastener. As such, the present invention's general purpose is to provide a new and improved lockable snap-clip fastener that is easy and intuitive to use, uses few component parts and is economical to manufacture.

To accomplish these objectives, the snap-clip fastener according to the present invention comprises two jaw members joint at a pivot and biased by a spring in a closed position. A locking bar passes through one jaw member and slides underneath an end of the spring. The bar may pass to one side or the other of the jaw member through which it passes and is held in position by the spring. In one position, the bar blocks passage of the other jaw member, while it allows passage in the other position.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BEST MODE FOR CARRYING OUT THE INVENTION

Figure 1:
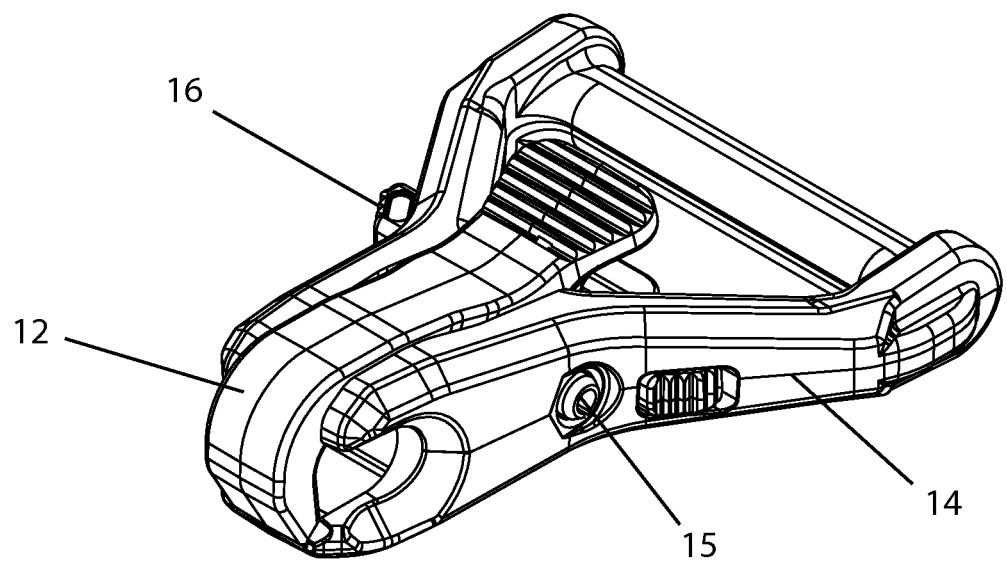
FIG. 1 is a perspective view of a fastener depicting the best mode of the present invention.

With reference now to the drawings, the preferred embodiment of the locking snap-clip fastener is herein described. It should be noted that the articles "a", "an", and "the", as used in this specification, include plural referents unless the content clearly dictates otherwise.

THE FOLLOWING REFERENCE NUMERALS ARE USED TO INDICATE THE FOLLOWING COMPONENTS OF THE DISPLAYED PREFERRED EMBODIMENT

8—connection hardware;
10—fastener;
12—mandible;
13—spring;
14—maxilla;
15—roll pin;
16—lock bar;
18—sling;
22—stop;
24—distal tab;
26—hooked tooth;
28—lever;
40—cradle;
42—pivot hole;

43—floor;
44—channel;
45—tooth;
46—back ridge;
48—attachment bar;
62—first tapered end;
64—ridge;
66—off-center vertical notch;
68—second tapered end.

Figure 2:
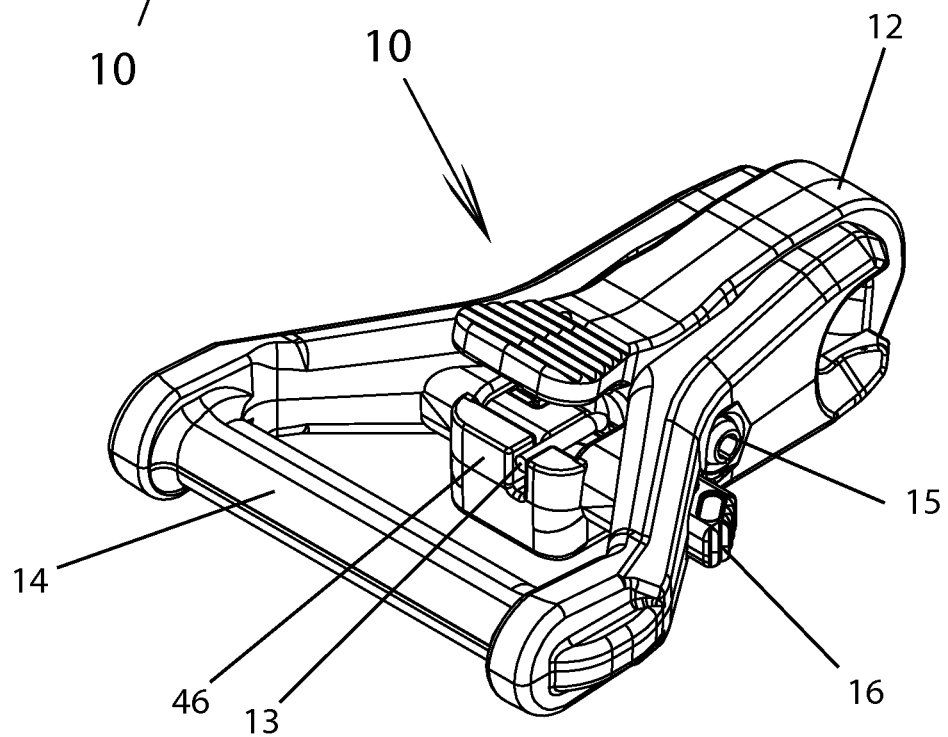
FIG. 2 is an alternate perspective view of the fastener of FIG. 1.

With reference to FIGS. 1 and 2, two jaw bodies, a mandible 12 and a maxilla 14, form the fastener 10. Maxilla 14 cradles mandible 12. The mandible 12 and maxilla 14 pivot relative to each other about a roll pin 15 and are biased in a closed position by torsion spring 13. Lock bar 16 passes through a middle portion of the maxilla 14 and may selectively impede movement of the mandible 12 relative thereto. This impediment allows the fastener 10 to be locked in an immovable position at the will of the user.

Figure 3:
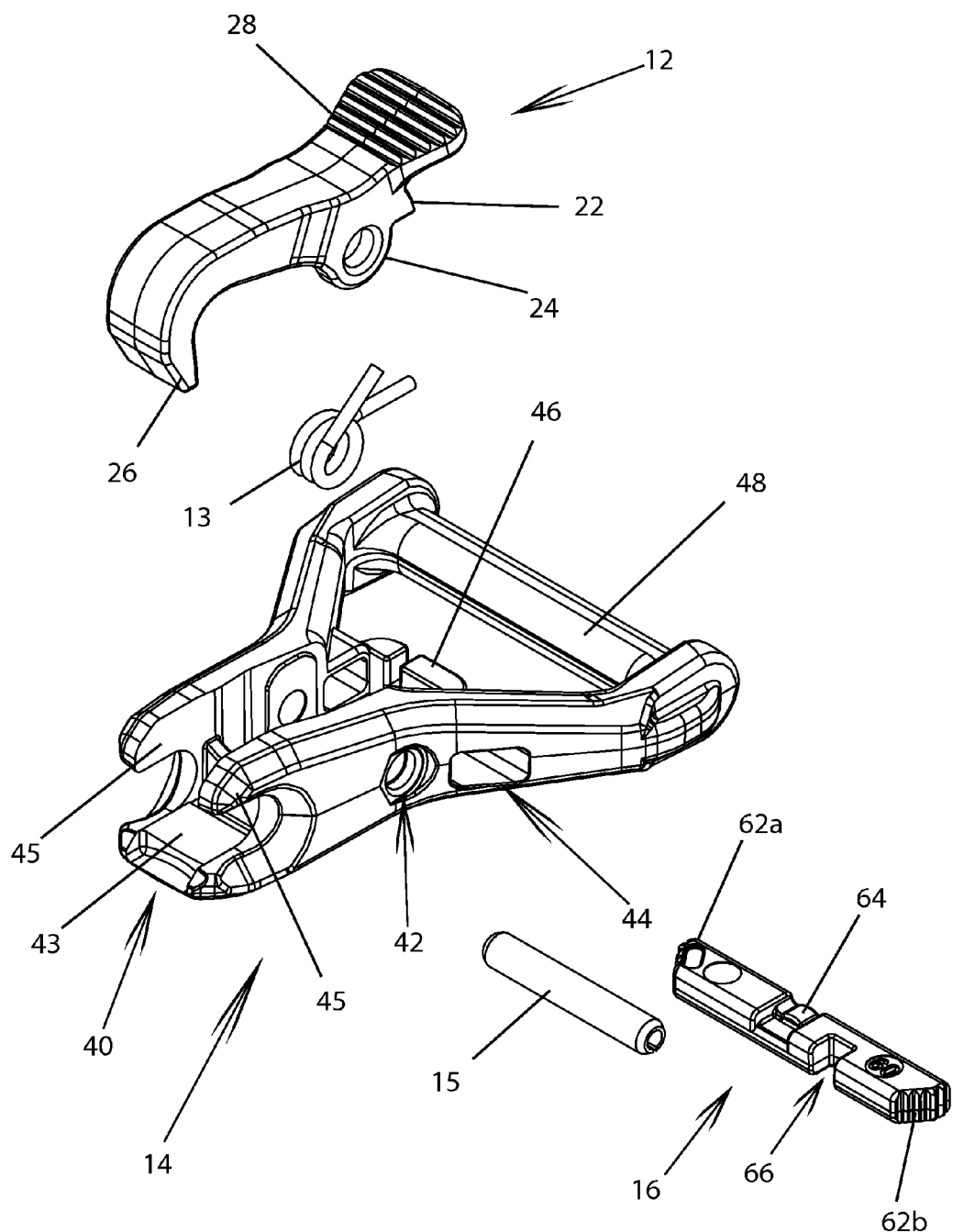
FIG. 3 is an exploded view of the fastener of FIG. 1.
Figure 4:
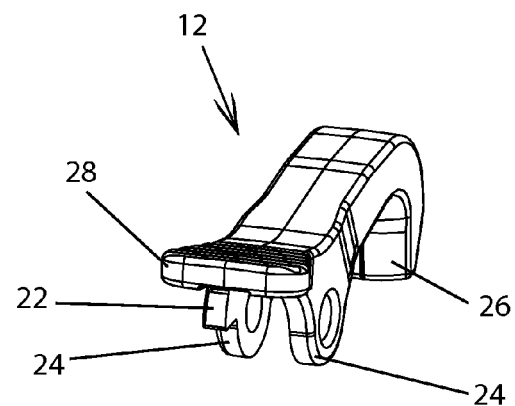
FIG. 4 is an alternate exploded view of the fastener of FIG. 1.
Figure 4:
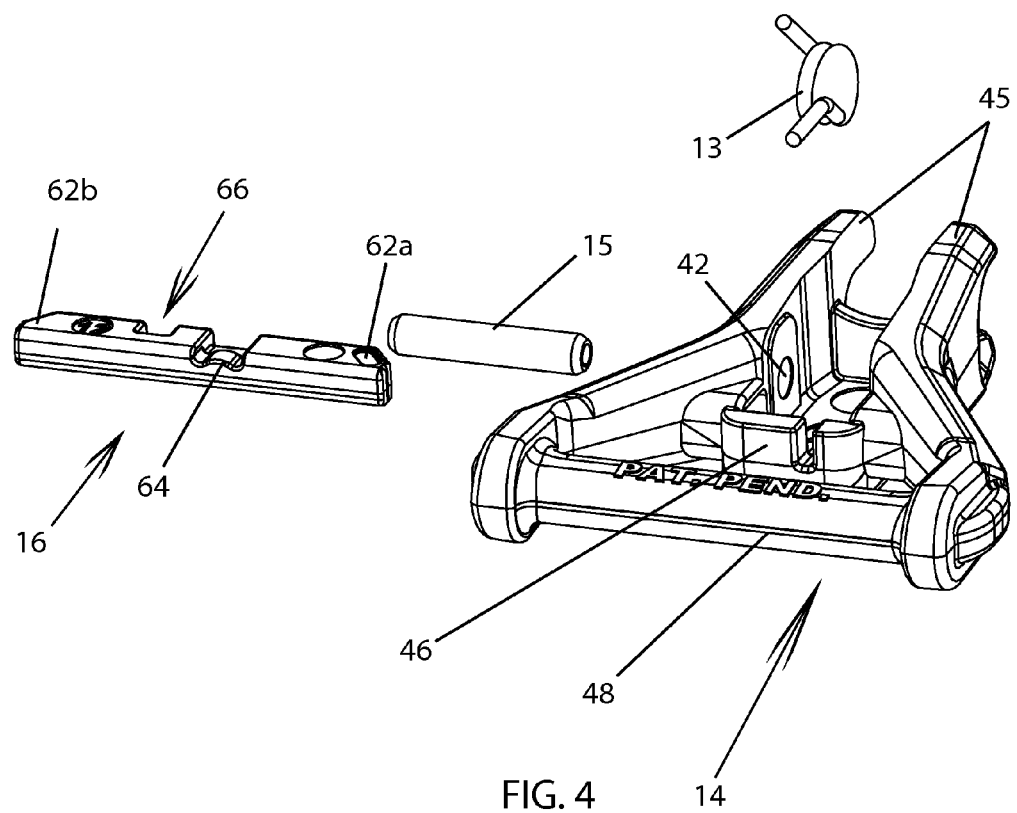
Figure 5:
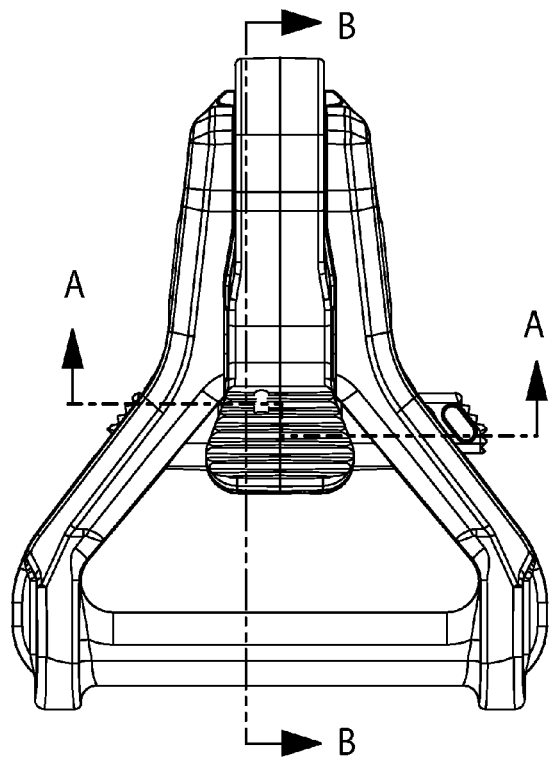
FIG. 5 is a plan view of the fastener of FIG. 1, unlocked.
Figure 7:
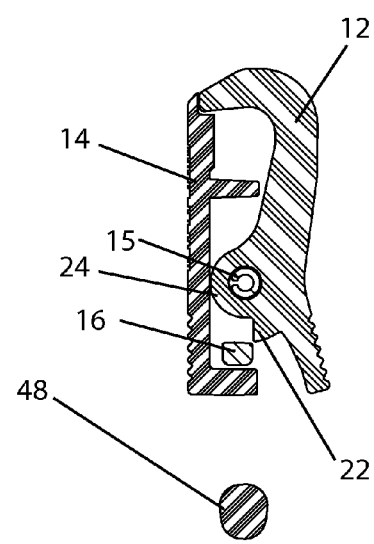
FIG. 7 is a sectional view of the fastener of FIG. 4, taken along line B-B.
Figure 6:
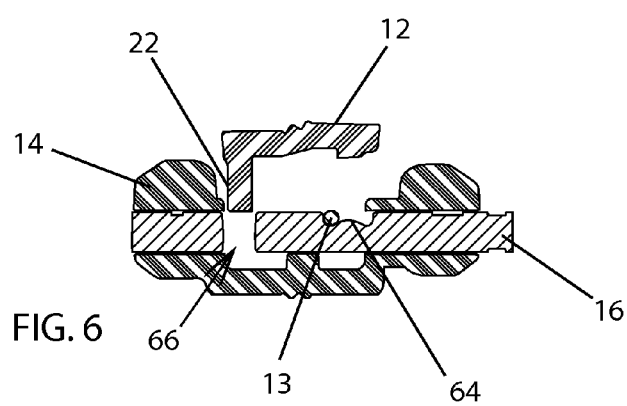
FIG. 6 is a sectional view of the fastener of FIG. 4, taken along line A-A.
Figure 11:
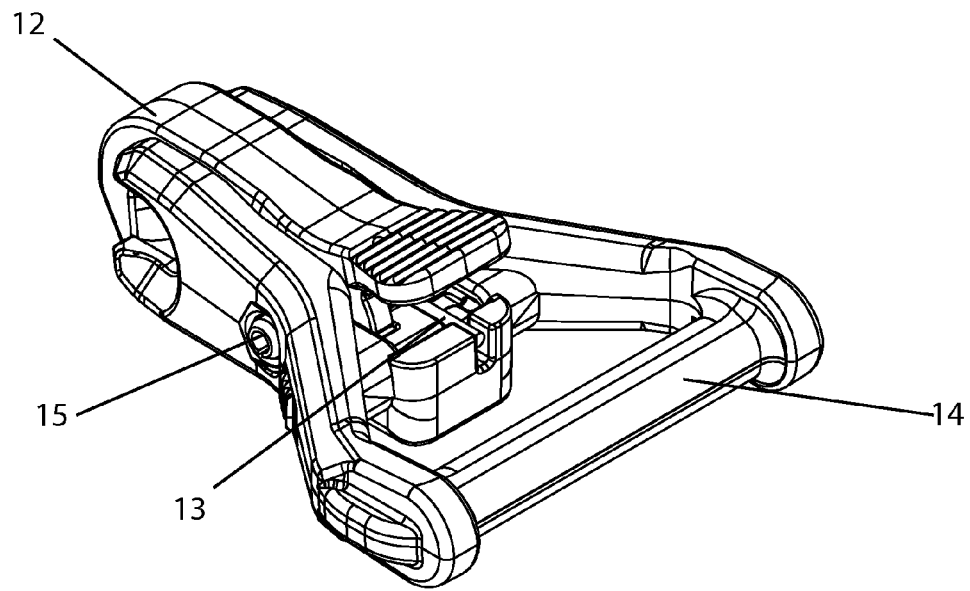
FIG. 11 is an alternate perspective view of the fastener of FIG. 1.

FIGS. 3 and 4 depict the components of the fastener in greater detail. The mandible 12 features a hooked tooth 26 on one end and a lever 28 on the other. Two distal tabs 24 are located on either side of the mandible 12, roughly one third of the length of the mandible 12 from a terminal end of the lever 28. Tabs 24 both feature coaxial through holes. A stop 22 is located on one side of the mandible 12 underneath the lever 28 and behind one tab 24. The maxilla 14 features a cradle 40 which interfaces with the hooked tooth 26. Cradle 40 features a floor 43 and two sides, which each terminate in a tooth 45, with space defined between each tooth 45 and the floor 43. Maxilla 14 also features an attachment bar 48 opposite the cradle. The attachment bar 48 defines a hind end of the maxilla 14. Two pivot holes 42 are provided in opposite walls of the maxilla 14, such that, when properly positioned, the holes in the tabs 24 are coaxial with the pivot holes 42. A roll pin 15 or similar structure is therein inserted to join the mandible 12 and maxilla 14 and serve as a pivot bar about which the jaw bodies respectively pivot. Torsion spring 13 is positioned about the roll pin 15, between the tabs 24, and is anchored with one arm in a slot on a back ridge 46 of the maxilla 14 (FIG. 11). The torsion spring 13 biases the jaw bodies in a closed position.

Figure 8:
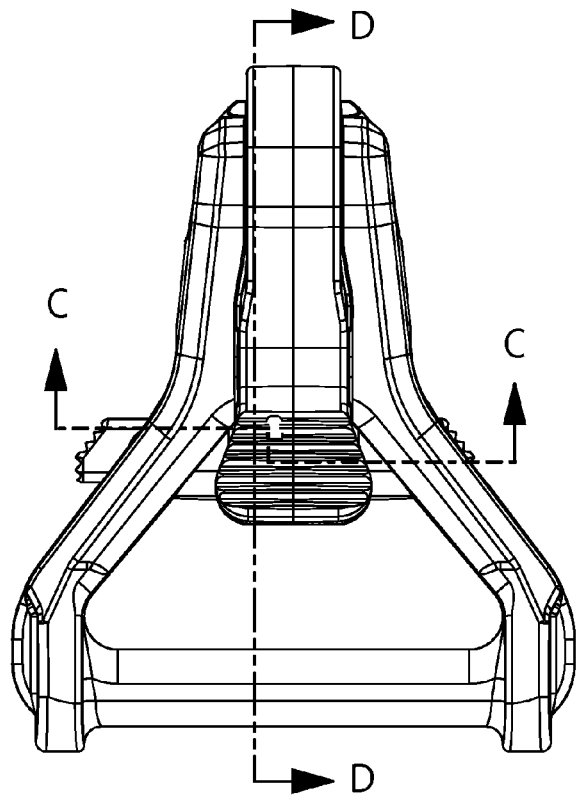
FIG. 8 is a plan view of the fastener of FIG. 1, locked.
Figure 9:
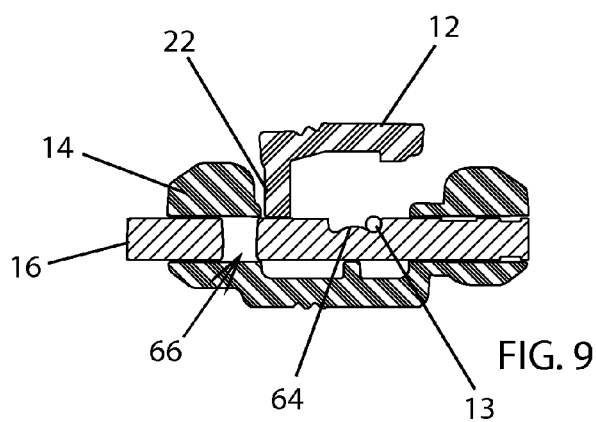
FIG. 9 is a sectional view of the fastener of FIG. 4, taken along line C-C.
Figure 10:
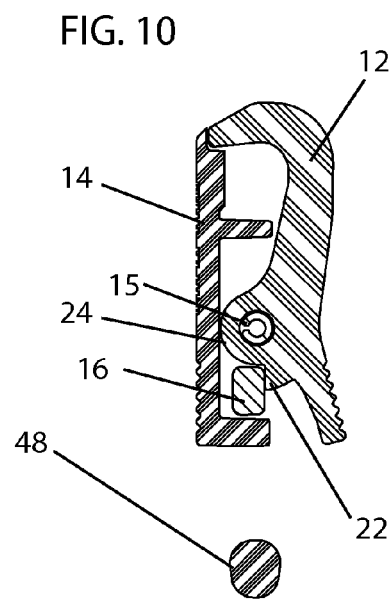
FIG. 10 is a sectional view of the fastener of FIG. 4, taken along line D-D.

The locking bar 16 passes through a channel 44 behind the pivot holes 42 in the maxilla 14. The locking bar features two tapered ends 62, 68, an off-center vertical notch 66 and a ridge 64 residing in a similarly off-center horizontal notch. Together, ridge 64 and the horizontal notch form two detents on either side of the ridge 64. When in position, the horizontal notch resides underneath the end of the spring 13 anchored in the back ridge 46. The interplay between these pieces is shown in a better view in FIG. 8.

In use, shown in FIGS. 5-10, the locking bar 16 is pushed to one side or the other. In an open position, shown in FIGS. 5-7, stop 22 is positioned over the notch 66, thereby allowing relative movement between the mandible 12 and maxilla 14. Spring 13 resides in an outer edge detent of the ridge 64 in the horizontal notch. Spring pressure biases the spring 13 against the locking bar 16 and maintains the locking bar's position. To lock the fastener, shown in FIGS. 8-10, a user presses the exposed tapered end of the locking bar 16 until enough force is applied to the spring 13 to cause it to jump ridge 64 and settle on its other side's detent. In this position, stop 22 is not positioned over vertical notch 66, but rather over a solid portion of the locking bar 16. This then prevents the mandible 12 and maxilla 14 from pivoting and opening the fastener. The locking bar 16 of the fastener then requires positive pressure from the user to switch from one position to another and remains in that position until the user consciously desires to change.

Figure 12:
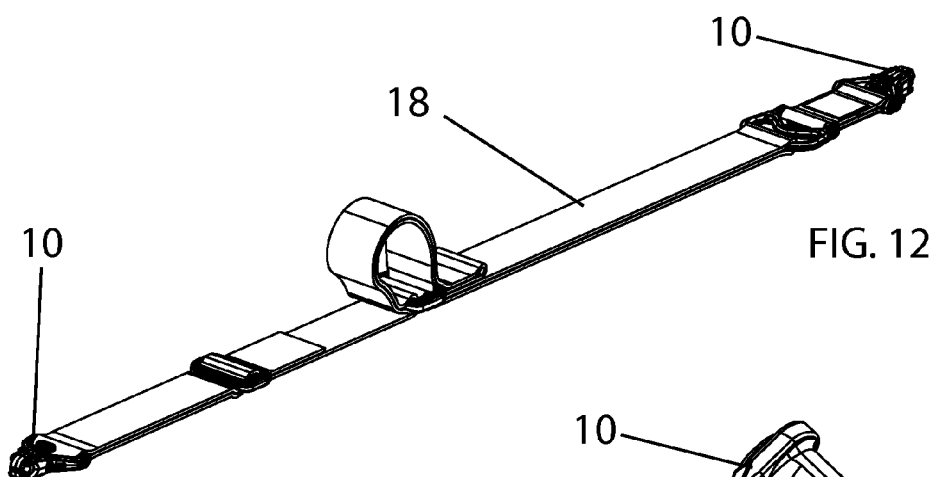
FIG. 12 is a perspective view of the fastener of FIG. 1 in use on either end of a sling.
Figure 13:
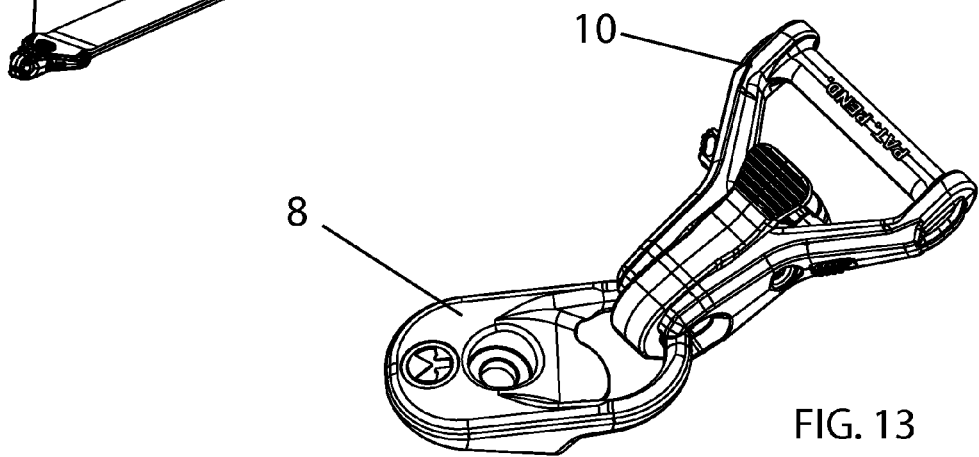
FIG. 13 is a perspective view of the fastener of FIG. 1, attached to a mounting loop.

This fastener 10 may be used in many different functions, such as the sling 18 shown in FIG. 12. In any setting, a strap may be secured about attachment bar 48 in any of the known, conventional means or through any means later discovered. In use, shown in FIG. 13, the fastener 10 is opened by unlocking it and depressing the lever 28 to separate the mandible 12 from the maxilla 14. A piece of connection hardware 8, such as a ring or bar, is positioned between the teeth 45 and floor 43 of the maxilla jaw 14 and the lever 28 released, thereby closing the hooked tooth 26 around the connection hardware. The fastener 10 is then locked as described above.

Although the present invention has been described with reference to preferred embodiments, numerous modifications and variations can be made and still the result will come within the scope of the invention. No limitation with respect to the specific embodiments disclosed herein is intended or should be inferred.

INDUSTRIAL APPLICABILITY

The present invention is capable of being produced in industry and being used as an aid in portage and other fields where carrying or fastening an object to another object is required. This Application illustrates the invention as being in use with a sling; however, the invention is capable of use with other objects, most notably straps and packs, where temporary but secure fastening of two objects is required. The attachment bar 48 is an example means by which the present invention is connected to the target object, in this case a sling. It should be readily appreciated that different attachment means may be utilized for different types of objects and different purposes. The present invention may be manufactured from any appropriate material, metals and plastics being considered ideal for durability and economical construction.

What is claimed is:
1. A clip fastener comprising:
 a. two hingedly opposable jaws, both jaws being biased into a closed position;
 b. a lock bar, situated within a channel in one of the jaws and capable of transverse slidable motion therethrough, the lock bar further comprising:
  i. a vertical notch located off center of the lock bar;
  ii. a horizontal notch located off center on an opposite side of the vertical notch; and
  iii. a ridge residing within the horizontal notch such that two detents are formed by the ridge and an interior of the horizontal notch;
 c. a stop tab, extending from one jaw to a location proximate the lock bar; and
 d. a spring with at least one end;
wherein, opening and closing the jaws defines a path of travel for the stop tab, the lock bar residing within the path of travel, and the at least one end of the spring resides within the horizontal notch of the lock bar such that upon moving the lock bar into open and closed positions the ridge of the lock bar may be selectably located upon either side of the end of the spring thereby selectively positioning the vertical notch in the path of travel and allowing passage of the stop tab and associated relative pivoting movement of the jaws when the lock bar is in an open position.

2. A locking mechanism for a fastener, the fastener having two pivotable jaws, and a torsion spring providing pivoting bias for said jaws, the locking mechanism comprising:
   a. a transverse bar, slidable through one of the pivotable jaws into, selectably, an open position and a closed position;
   b. a ridge residing off-center on a top side of the transverse bar in a manner to interface with an arm of the torsion spring, the ridge interfacing with the arm of the torsion spring such that, when the transverse bar is in an open position the arm of the torsion spring is on one side of the ridge and, when the transverse bar is in a closed position, the arm of the torsion spring is on another side of the ridge;
   c. a vertical notch located oppositely off-center from the ridge on the transverse bar; and,
   d. a stop tab located on one of the jaws in a manner to interface with the transverse bar when the transverse bar is in the closed position and to interface with the notch when the transverse bar is in the open position.

3. The locking mechanism of claim 2, the ridge residing in a horizontal notch on the transverse bar.

\* \* \* \* \*